United States Patent
Kloor (12) United States Patent (10) Patent No.: US 11,270,284 B2
(45) Date of Patent: Mar. 8, 2022

(54) SYSTEM AND METHOD FOR A LINE OF CREDIT BASED DIGITAL CONTENT MULTI-CHAMBERED CLOUD BASED DISTRIBUTION PLATFORM

(71) Applicant: EXPONENTIAL HORIZONS, LLC, Warrenville, IL (US)

(72) Inventor: Harry Thomas Kloor, Burbank, CA (US)

( * ) Notice: Subject to any disclaimer, the term of this patent is extended or adjusted under 35 U.S.C. 154(b) by 114 days.

(21) Appl. No.: 16/775,049

(22) Filed: Jan. 28, 2020

(65) Prior Publication Data

US 2020/0167758 A1 May 28, 2020

Related U.S. Application Data

(63) Continuation of application No. 14/612,815, filed on Feb. 3, 2015, now Pat. No. 10,586,223.

(60) Provisional application No. 61/935,042, filed on Feb. 3, 2014.

(51) Int. Cl.
*G06Q 20/24* (2012.01)
*G06Q 20/08* (2012.01)
*H04L 67/60* (2022.01)

(52) U.S. Cl.
CPC ........... *G06Q 20/24* (2013.01); *G06Q 20/085* (2013.01); *H04L 67/32* (2013.01)

(58) Field of Classification Search
CPC ..... G06Q 30/02; G06Q 30/0236; G06Q 20/24
See application file for complete search history.

(56) References Cited

U.S. PATENT DOCUMENTS

| | | | | |
|---|---|---|---|---|
| 8,868,444 | B2* | 10/2014 | Morris | G06Q 10/087 705/14.12 |
| 8,955,006 | B2* | 2/2015 | Fang | H04N 21/4784 725/23 |
| 2005/0027616 | A1* | 2/2005 | Jones | G06F 21/10 705/26.3 |
| 2006/0168617 | A1* | 7/2006 | Maetz | H04N 21/4622 725/35 |
| 2008/0221986 | A1* | 9/2008 | Soicher | G06Q 30/0258 705/14.36 |
| 2010/0228613 | A1* | 9/2010 | Anderson | H04N 21/812 705/14.13 |

* cited by examiner

*Primary Examiner* — Sarah B McPartlin
(74) *Attorney, Agent, or Firm* — Caldwell Intellectual Property Law, LLC (57) ABSTRACT

A method for access to a digital content distribution platform includes receiving a request for initial access of a user and granting access to the digital content distribution platform based upon the request for initial access. Granting access includes providing the user with a line-of-credit configured to renew at least a portion of the line of credit when a debt accrued in the line-of-credit is satisfied. The method includes receiving a selection of a digital content file and providing the user with access to the selected digital content file in exchange for the payment from the line-of-credit. The method includes incorporating an interactive advertisement into the selected digital content file according to a parameter associated with the user with the interactive advertisement configured to receive an interaction. The method includes renewing, in response to the interaction, at least a portion of the line of credit.

20 Claims, 3 Drawing Sheets

SYSTEM AND METHOD FOR A LINE OF CREDIT BASED DIGITAL CONTENT MULTI-CHAMBERED CLOUD BASED DISTRIBUTION PLATFORM

REFERENCE TO RELATED CASES

The present application is a continuation of U.S. patent application Ser. No. 14/612,815 entitled "System and Method for a line of Credit Based Digital Content Multi-Chambered Cloud Based Distribution Platform" filed Feb. 3, 2015 which claims the priority of U.S. Provisional Patent Application No. 61/935,042 filed on Feb. 3, 2014, wherein the content of each above referenced application is hereby incorporated by reference in its entirety.

TECHNICAL FIELD

The present invention relates to the field of digital content delivery from a server to an end user device.

BACKGROUND

Services offer the delivery of digital content to a wide range of computer devices. Digital content is delivered and consumed on computers, mobile devices, smart phones, computer tablets, laptop computers, desktop computers as well as on televisions, smart televisions, and monitors through a wide range of devices including without limitation BLU-RAY digital optical disc players, XBOX game consoles, ROKU digital video players, PLAYSTATION game consoles, WII and WII U game consoles, APPLE TV devices, WESTERN DIGITAL Media Players, BOXEE BOX set-top device, and NINTENDO 3DS. Such digital content that is delivered by download may include books, game cards, motion comics, interactive books, music, games, and video content.

The content may be delivered on platforms that support one or more type of digital media. For example, video content is provided by NETFLIX, HULU, CRACKLE, AND AMAZON PRIME INSTANT VIDEO streaming services; as well as by numerous TV networks and cable channel applications, pay channel applications including HBO GO. In some instances, cable networks may also offer streaming content for digital delivery via mobile and computer applications. Other services may deliver music, games, and printed material in digital form. Digital books, digital comics, and interactive print material and motion comics may be delivered to networked devices. Such material may be consumed on general computers and tablet devices as well as on specialized devices such as the KINDLE or NOOK e-readers. Numerous platforms exist for consumers to stream audio content, such as ITUNES, SPOTIFY, DIY MUSIC, GOOGLE PLAY audio streaming services. Still other platforms provide for the delivery of video games through numerous platforms such as GAMES ON DEMAND, BOX, GAMEFLY, and PLAYSTATION NETWORK online digital game delivery services, as well as numerous game-specific portals such as WORLD OF WARCRAFT, AION, LORD OF THE RINGS ONLINE, EVE ONLINE, TERA, THE SECRET WORLD, RIFT, and STAR WARS THE OLD REPUBLIC, AND GUILD WARS 2 digital delivery services.

Systems employ one of two types of system models. The first model provides end users with unlimited content, which is a subscription model. The second model used is the storefront model, which is a pay-per-item model used. These two models have shortcomings, and there is a need in the art to solve these problems. The models do not effectively serve the intellectual property holders of the content, such as studios, book publishers, game studios, music publishers, because the models provide no data, or only a single data point (point of sale info), regarding the consumer/member. Data and information are extremely important and valuable resources, and the failure of the existing digital delivery models to collect additional data and information are shortcomings. Moreover, in creative industries such customer information is of enormous value because if allows for increased effectiveness for marketing and crafting of new content to end users. The existing models do not adequately support these activities and employ the contrarian approach of hording data without optimizing its value. In addition, by intermediating between end users/members and intellectual property rights owners, both models fail to provide the intellectual property rights owners with the ability to directly interact with the end user/member regarding content that is not available on the platform.

Digital content delivery models deliver digital content through various computer networks and cloud servers. These models deliver content to individual users upon request to a plurality of devices, which enables users to access digital content from a broad category of choices through an on-demand basis. In existing systems, payment by the end user is accomplished through a yearly or monthly rental or subscription contract. Alternatively, other systems provide content to end users for free and display advertising content interstitially to the end user as the content is consumed, such as television commercial advertising, as employed on broadcast television, or displayed alongside the content, such as banner ads. Such systems may permit the user to play back or otherwise display the digital content more than once, while preventing unauthorized users from gaining access to the digital content via a limit to the number of devices that the content may be consumed on in some fashion.

Some systems limit the number of devices on which a purchased digital song or movie may be installed, while other systems limit the number of digital devices that may simultaneously access the subscription service, enforced through a password protected user account. A limitations shared by such digital content delivery systems is that, unlike physical content that may be shared and used on multiple devices at various locations and various times, the existing digital content delivery systems do not allow the sharing of the content in the same way that a consumer may share purchased or rented material. For example, when an end user rents or purchases a movie on a BLU-RAY digital optical disc, the disc may be handed to any number of friends for viewing without limitation. In contrast, digital content may not be similarly shared among friends for viewing without violating license terms or permissions.

None of the existing digital content delivery systems allows users to freely share digital content offered by a digital content provider. The present invention addresses these shortcomings and fulfills the need of consumers to share content legally by providing a platform that facilitates and encourages users to distribute the content freely, while simultaneously benefiting the content owners. Existing platforms and distribution systems also fail to provide mechanisms for members to promote content to members of a platform and be rewarded for such promotion.

Many digital content providers require end users to sign up for a subscription service, paying a monthly or yearly subscription fee in exchange for unlimited content. Other services allow end users to purchase content one item at a time, such as a storefront model. Under these systems, consumers are required to pay prior to receiving or viewing the content, which is yet another shortcoming.

Some services offer a limited trial period, wherein an end user may access the service for a month or is granted access to a trial version of software or service with limited functions. Such free trials require a credit card or other personal data from the consumers that they may be reluctant to provide. Other digital content delivery systems do not charge for some or all of their content but instead use an advertisement model, whereby commercials are displayed before and during delivery of the content. Other systems display advertisements on the screen along with the content. Such an approach, however, creates a distraction to the viewers because it either delays the consumption of the digital content, or is displayed continuously alongside the content, thereby offering a suboptimal end user experience. The present invention solves these and other shortcomings of existing systems.

SUMMARY

The present invention relates to digital content delivery from a server to an end user device. In certain embodiments, a system and a method are provided for dynamic, flexible, secure distribution of digital content from a proprietary distribution point utilizing a multi-chambered cloud-based server system with a client-server delivery model having integrated peer-to-peer distribution and variations thereof. Platform content may be purchased or rented utilizing a platform specific line-of credit, which is provided to the user of the system when the user applies for, and is granted, a membership to the system.

In an aspect, a method for access to a digital content distribution platform. The method includes receiving, from a user computing device, a request for initial access of a user to a digital content distribution. The method also includes granting access to the digital content distribution platform based upon the request for initial access. Granting access can include providing the user with a line-of-credit usable by the user to purchase access to digital content files from the digital content distribution system. An indication of the line-of-credit provided to the user can be transmitted electronically to the user computing device of the user. The line-of-credit is configured to renew at least a portion of the line of credit when a debt accrued in the line-of-credit is satisfied. The method also includes receiving, from the user, a selection of a digital content file located on the digital content distribution platform and providing the user with access to the selected digital content file in exchange for the payment from the line-of-credit. The method can also include incorporating an interactive advertisement into the selected digital content file according to a parameter associated with the user, said interactive advertisement configured to receive an interaction from the user computing device and transmitting the selected digital content file and incorporated interactive advertisement each configured to display on a graphical user interface (GUI) of the user computing device. Further, the method can include renewing, in response to the interactive advertisement receiving the interaction, at least a portion of the line of credit.

In another aspect, a system for access to a digital content distribution platform. The system can include a digital content distribution platform that includes a server. The server can be configured to receive, from a user computing device, a request for initial access of a user to a digital content distribution and grant access to the digital content distribution platform based upon the request for initial access. Granting access can include providing, via a line of credit module operating on the server, the user with a line-of-credit usable by the user to purchase access to digital content files from the digital content distribution system. The indication of the line-of-credit provided to the user is transmitted electronically to the user computing device of the user and the line-of-credit is configured to renew at least a portion of the line of credit when a debt accrued in the line-of-credit is satisfied. The server can also be configured to receive, from the user computing device, a selection of a digital content file located on the digital content distribution platform. The digital content distribution platform can also include an application server. The application server can be configured to provide the user with access to the selected digital content file in exchange for the payment from the line-of-credit and incorporate an interactive advertisement into the selected digital content file according to a parameter associated with the user, said interactive advertisement configured to receive an interaction from the user computing device. The application server can also be configured to transmit the selected digital content file and incorporated interactive advertisement each configured to display on a graphical user interface (GUI) of the user computing device and renew, via the line of credit module and in response to the interactive advertisement receiving the interaction, at least a portion of the line of credit.

The present invention offers a new method of attracting consumers to digital platform and a new approach to paying for the content that allows for open ended sharing. According to an embodiment of the present invention, a digital content delivery platform is provided that grants to all authorized users a membership account that includes a line of digital-content-credit with which to access an online digital content. A line-of-credit is granted to each new authorized account holder by machine-readable code arranged to identify the hardware or the user so as to limit the number of authorized accounts a user may create. The creation of the membership account is performed on the basis of calculated reliance whereby, without requiring the user to provide a financial instrument or private data such as credit card, debit card, or bank information, PAYPAL Internet payment service account identification, or a social security number or birthdate, the member may provide the system with only a membership name and password.

The amount of credit that the system extends to a user is finite, but a system operating in accordance with the present invention as described in the embodiments herein may offer a plurality of means to increase a user's limit within the system, as well as a plurality of means to pay off the debt accrued in the line-of-digital-content credit. Such means may include paying off the debt with cash, credit card, bank card, PAYPAL Internet payment service account identification, check, wire, or other monetary exchanges; paying down the debt by consuming certain types of digital content, creating certain types of digital content, sharing content that is then consumed, recruiting new members, social networking activates, interacting with digital content, purchasing physical products and/or digital products and/or digital services.

The system tracks a user's line-of-credit available for allocating towards digital content for the user's consumption. According to an embodiment of the present invention, a user's line-of-credit may accumulate within the system, whereby users may build up a larger reserve of credit for future consumption of goods. Such accumulation may be accomplished through a financial instrument, or through Activities, which are detailed in the embodiments as disclosed herein. The Activities provide a means for a user to consume content within the system without paying cash or other financial instrument. For example, a user may initially obtain a membership and receive an initial line of credit with a limit of $100 dollars. In this example, the user may consume digital content having an aggregate value of $73. The user, through a combination of a credit card payment of $8 and Activities that earn the user's account $130, may apply credit to his account in the amount of $138 dollars. The $138 is applied to the user's consumed digital content, thereby effectively over paying the debt of $73, and leaving the user with a positive balance of $65. The net $65, when combined with the initial $100 line-of-credit, results in the users having a total of $165 of credit that may be applied to digital content before expending the entire line-of-credit limit.

The foregoing allows the user to first consume desired digital content and then, at a future date subsequent to viewing the desired content, earn additional credit within the system via Activities, such as consuming ad content as a means of paying for the desired content. The system of the present may provide a flexible means for users to choose when they will consume ad content, if at all, and when they will consume desired content. Thereby, all digital content deliverable by the system may be offered on an on-demand or instant basis, with the difference being that debt accrued to the line-of-credit may be positive, zero, or negative. Similarly, users of the system may share, socially promote, or interact with the content, and may accrue positive, negative, or zero dollars to the line-of-credit.

DETAILED DESCRIPTION

Figure 1:
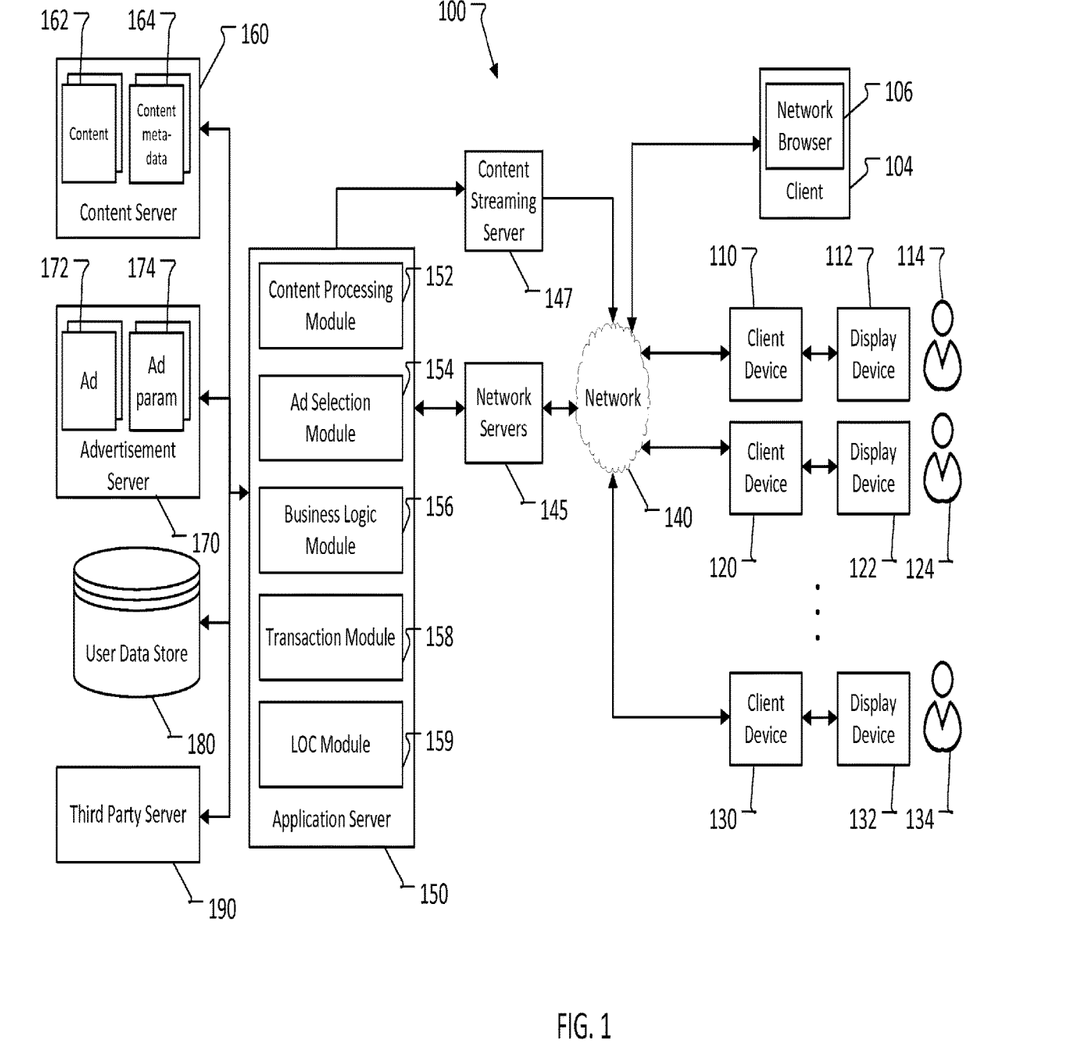
FIG. 1 illustrates a block diagram of an environment for a line of credit based digital content application platform according to an example described herein.

According to an embodiment of the present invention, a system and method is provided for a Line of Credit based Digital Content Application Platform installable on multiple platforms with online and offline access to digital content. FIG. 1 is a block diagram of an environment for a line of credit (LOC) based digital content application platform 100, which provides an LOC digital content delivery service, in accordance with the present invention. The LOC Digital Content Application Platform of FIG. 1 may include a system of servers in communication with a system of client devices over a network. Multiple client devices 110, 120 and 130 communicate with, or include, display devices 112, 122 and 132, respectively, and users 114, 124 and 134 are associated with each display device and client device combination, respectively. A user 114 may provide input and instructions to client device 110 to retrieve and playback video content or other content through display device 112. In certain embodiments, the digital content delivery service is implemented by one or more application servers 150 and one or more network servers 145. In some embodiments, the system providing LOC digital content delivery service may also include any of additional servers: content streaming server 147, content server 160, ad server 170, user data store 180, and third party servers 190, as described in more detail herein. Those skilled in the art will appreciate that other environment and architectures may be employed without departing from the present invention.

In one example, client devices 110, 120, and 130 and client 104 are coupled to network 140. The network 140 may include one or more wired or wireless computer networks, such as the Internet, a Wide Area Network, a Local Area Network, an Ethernet network, a Wi-Fi network, a cable television network, a landline telephone network, a cellular telephone network, a digital subscriber line (DSL) network, a Wi-Max network, an asynchronous transfer mode (ATM) network, and the like. The network 140 may include one or more such computer networks which communicatively interface with one another. One or more of each such computer network may provide one-way communication paths, and one or more other of each such computer networks may provide two-way communication paths. Network 140 may facilitate communication between network server 145, client 104 and client devices 110, 120, and 130, as well as servers 147, 150, 160, 170, 180, and 190.

Client devices 110, 120, and 130 may be implemented as a variety of different types of devices including, without limitation, computers, mobile devices, smart phones, computer tablets, laptop computers, desktop computers, all-in-ones, 2-in-1s, and the like. Such devices may receive and/or display digital content through a viewer user interface. Other client devices 110, 120, and 130 may include BLU-RAY digital optical disc players, XBOX game consoles, ROKU digital video players, PLAYSTATION game consoles, WIT and WIT U game consoles, APPLE TV devices, WESTERN DIGITAL Media Players, BOXEE BOX set-top device, and NINTENDO 3DS, and set-top boxes. The latter devices may embed the technology described herein directly and display such digital content on a separate display device 112, 122, 132, including but not limited to televisions, smart televisions, monitors, mobile devices, gaming consoles, watches, phones, and digital cameras. The client devices may be configured to interact with other client devices or servers 145, 147, 150, 160, 170, 180 and 190 communicatively couple with the client device over a network. The client devices 110, 120, and/or 130 may facilitate interaction between their respective users as part of a social network.

Client 104, which may include a personal computer, is coupled to network 140 and may include network browser 106. Network browser 106 may request, receive and provide network content such as a web page. For example, a user may access a LOC digital content delivery service provided over network 140 through network browser application 106. Client 104 may perform any function described herein as being performed by client device 110, 120, or 130, and vice versa.

Network server 145 may include one or more servers and communicates with application server 150 and network 140. Network server 145 may be implemented as a web server that operates as an intermediary server between application server 150 and network 140. For example, network server 145 may be a web server or application web server that receives requests from client 104 and client devices 110, 120 and 130, processes and forwards the requests to application server 150, and sends a response generated by application server 150 to the requesting client or client device.

Application server 150 communicates with network server 145, may include one or more servers, and includes logic which implements the LOC digital content delivery service of the present technology. Application server 150 may include content processing module 152, ad selection module 154, business logic module 156, transaction module 158, and Line of Credit (LOC) module 159. Each of the modules 152, 154, 156, 158, and 159 may be implemented on a different application server or backend server, such as content servers 160, ad servers 170, user data store 180, and/or third party servers 190. Other modules and logic may be incorporated on application server 150 in addition to those illustrated in FIG. 1.

Content processing module 152 may receive, encode, and transmit video, audio, images and other content to client 104 and client devices 110, 120, and 130 through network server 145. The content may be transmitted as a complete file, a streaming data such as streaming video, or in some other format. Content processing module 152 may optionally incorporate selected advertisements received from or identified by ad selection module 154 within video content and transmit the video content with the incorporated ads.

Ad selection module 154 may access advertisement media and advertisement parameters from ad server 170. The ad parameters specify how ads may be incorporated into a particular content file by content processing module 152. The parameters may indicate a user gender, geographic location, income level, marriage status, or other user demographic data, as well as user viewing behavior, purchase behavior, and other user data, or the ad may be selected directly by the user. The ad parameters may also specify content categories, brand adjacency, frequency requirements, cost information, and other display rules for providing the ad to a user.

Business logic module 156 may handle various business logic and processing rules associated with the LOC digital content delivery service as described in more detail herein. For example, business logic module 156 may manage extending, increasing, or decreasing users' lines of credit. Business logic module 156 may also manage user loyalty and reward programs that reward users for certain viewing behavior and interaction with advertisements. Business logic module 156 may also retrieve and manage user data contained in user data store 180 and determine revenue distribution among different participants in a LOC digital content delivery service ecosystem, such as users, advertisers, content providers, merchants, network service provider companies, including cable companies, power companies, telephone companies, and the like, and other groups.

Transaction module 158 may facilitate commerce transactions between a client device and third party server 190. Facilitating a purchase transaction allows a user to purchase goods or service associated with an advertisement through the LOC digital content delivery service.

LOC module 159 may manage extending a user a line of credit, and manage a user's available credit in conjunction with business logic module 16 and transaction module 158. As described in more detail herein, the LOC module may determine an appropriate LOC to extend to a user based on a variety or predetermined criteria. The LOC module may determine an appropriate LOC and extend such amount to a user based only a membership name of a user as provided by the user of an authorized account. The LOC module 159 may manage accounting of user credit, including user accounts in which credit is earned by users are transferred into (e.g., deposited or earned), held (e.g., banked), and transferred out of (e.g., withdrawn or spent). The LOC module 159 may provide numerous accounting and reporting functions relating to the credit in a user account. For example, the LOC module 159 may track transactions and provide a statement to a user detailing transactions involving credit in the user's account over a specified period of time (e.g., hourly, daily, monthly, quarterly, or annually). The statement of transactions may include account balances as well as identify each transaction by a transaction identifier (e.g., I.D.), a date, a time of day, a description of the transaction, an amount of credit, and a type of credit involved. The LOC module 159 may also provide statistics regarding a user's account of credit, including a ranking compared to the user's peers, entertainment system service level, and/or a level of credit achievement. The LOC module 159 may also enable a user of a credit account to dispute a transaction involving the credit.

The LOC module 159 may manage a user's access to account information, including assigning and authenticating a user ID and password, storing and updating an email address, a phone number, a physical address, and other personal information associated with the user. The LOC module 159 may also manage a legal tender account associated with the user. In some embodiments, the user's legal tender account and reward credit account may be combined or integrated together for easy reference, cross-reference, analysis, and/or reporting. The LOC module 159 may also track a user's lists of family members, friends, groups, and other relationships with other users and/or third parties. The LOC module 159 may provide comparative analyses to a user in which the user's account history is compared with other users according to measurable factors such as demographics, geographic information, groups, buddies, credit earning categories, credit spending categories, trends, and the like. In various embodiments, the other user information may be aggregated and reported as a group or individually.

The LOC module 159 and the business logic module may also control the rules and policies by which credit are earned and exchanged by a user of the client device 110, 120, or 130. These modules may control the operation of programs involving the rewards and provide a social networking functionality, enabling a user to compare the user's rewards earnings with the user's peers and friends.

Application server 150 may transmit content through content streaming servers 147. In some embodiments, content streaming servers 147 may include one or more servers configured to stream content to several client devices. For example, content streaming servers 147 may include a host stream device which receives content and advertising content. The host stream device may provide content to one or more streaming servers which establish connections with a client device and stream media content, including requested and recommended content as well as advertisements, to the client.

Application server 150 may communicate with content server 160, ad server 170, user data store 180, and third party server 190. Content server 160 may store content 162 and related information, including metadata 164 for stored content, which may be retrieved by application server 150. Content 162 may comprise movies, TV episodes, offers, and other video, as well as audio and image media, interactive media and application services such as two-way Voice Over Internet Protocol (VOiP) telephony, two-way video and other interactive applications. Content metadata 164 may include information associated with each piece of content or an offer, such as a content category (i.e., comedy, drama, sports, documentary, and the like), content length, break points within the content for inserting ads, credit associated with playback for content, and other data associated with the content.

A content server 160 may communicatively couple with the application server 150 and/or the client device 110, 120, or 130 via the network 140 to provide digital content such as entertainment programs and advertisements. Content server 160 may include one or more computing servers configured to transmit audio/video content such as entertainment programs and advertisements over the network 140. The content server 160 may be associated with a television, movie, or audio recording studio. In addition, a third party server 190 may communicatively couple with the application server 150, the client device 110, 120, or 130, and/or the content server 160 via the network 140.

Advertisement server 170 may communicate with application server 150 and may include one or more advertisement content 172 as well as advertisement parameters 174 associated with each advertisement. Advertisement content 172 may be associated with a company, product, service or some other topic of potential interest for a user. The advertisement parameters 174 may indicate to whom a particular advertisement should or is required to be provided to, as well as cost information, timing information and other advertisement requirements. Advertisement parameters may be configured for an advertisement by an advertiser with preferred and required parameters for matching an ad to a combination of a user data (including user demographic data), media content, and time.

User data store 180 may communicate with application server 150 and include data for users having an account with the LOC digital content delivery service. The user data may include user demographic data, user playback data, user purchase data, available credit and other data associated with a user of the LOC digital content delivery service.

Third party server 190 may handle purchases or other transactions requested by a user through client device 110, 120, or 130. Third party server 190 may be associated with an e-commerce service, a particular service or product provider, some other organization, or any of the other services or modules identified in LOC digital content application platform 100. Third party server 190 may include one or more computing servers configured to provide services or products via interactions with the client device 110, application server 150, and/or content server 160. The third party server 190 may be associated with a financial institution such as a bank, credit card services provider, merchant of physical goods, merchant of digital content, computing and/or communications services provider, and the like. There may be one or more different third party servers 190 communicatively coupled with the network 140.

In operation, the system and method of LOC digital content application platform 100, maintains digital content in content server 160 or a third party server 190, enables access to that digital content for users 114, 124, 134, provides membership system that extends a line of credit and access to the digital content platform via LOC module 159, one or more means to interact with the digital content; and one or more computer applications to access the digital content and/or upload content.

Figure 2:
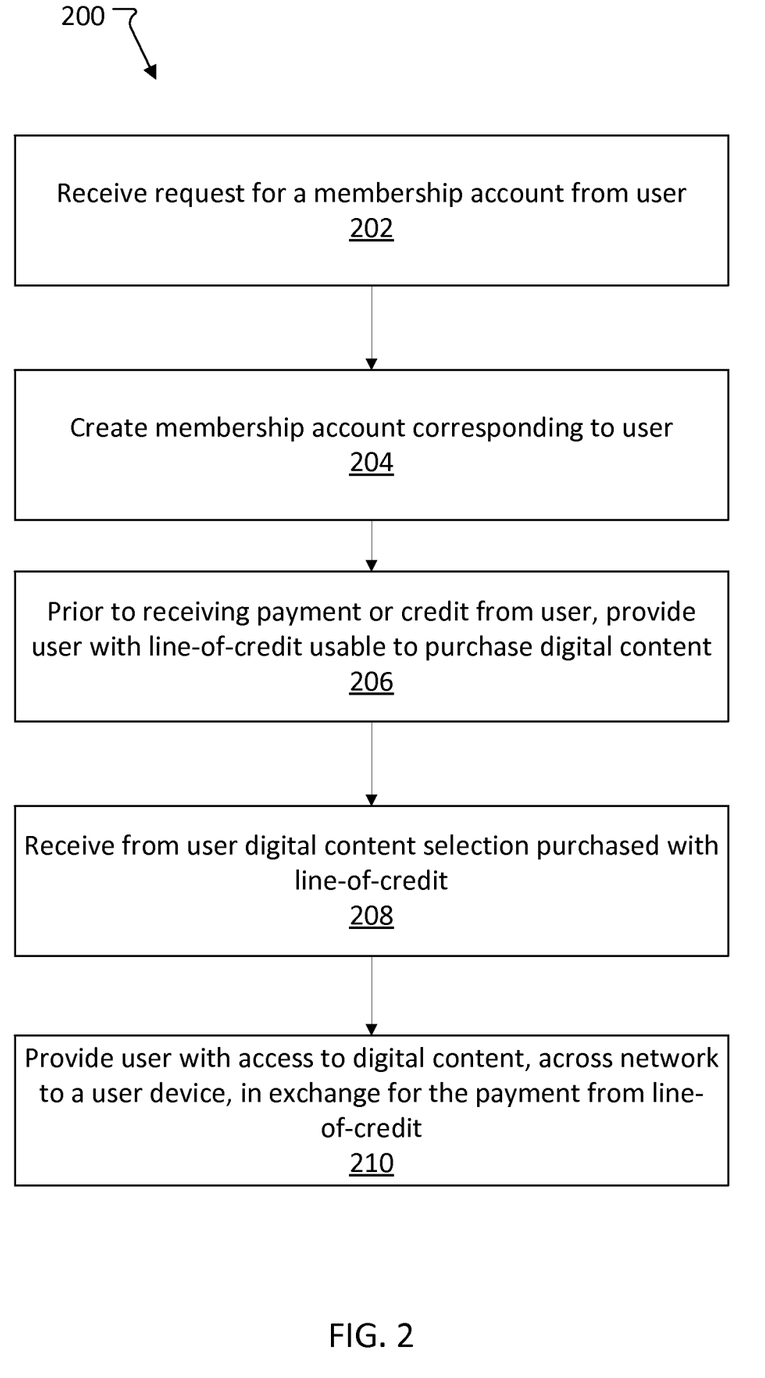
FIG. 2 illustrates an overview of a process to utilize a line of credit based digital content application platform according to an example described herein.

FIG. 2 illustrates a method 200 for providing a digital content distribution platform. The method may be performed by hardware and software contained in LOC digital content application platform 100. The user may use a client device such as the client device 110 to interact with system by communicating with a server such as the application server 150 over a network such as the network 140. At step 202, application server 150 receives from a user of the digital content distribution system a request for a membership account with the digital content distribution system. At step 204, application server 150 creates the membership account corresponding to the user. At step 206, the application server 150 provides the user, prior to receiving payment or credit from the user, with a line-of-credit. The line-of-credit is usable by the user to purchase access to digital content from the LOC digital content application platform 100. At step 208, the application server 150 receives a digital content purchase selection from the user. The purchase selection includes an indication from the user to purchase access to digital content from the digital content distribution system in exchange for payment from the line-of-credit. At step 210, the application server 150 provides the user with access to the purchased digital content from the digital content distribution system across the network to the user's client device 112. The access and delivery of the content is provided to the user in exchange for the payment from the user's line-of-credit.

In the LOC digital content application platform 100, premium content generally refers to digital content that is approved by and/or placed on content server 160 by the owners or operator of the platform. Such premium content may be distinguished in the LOC digital content application platform 100 from content that is created by members and uploaded to the system. Premium content may be provided to the system platform 100 by intellectual property owners, licensors, or distributors of the content, such as book publishers, movie/TV studios, game publishers, music publishers, comic publishers.

Figure 3:
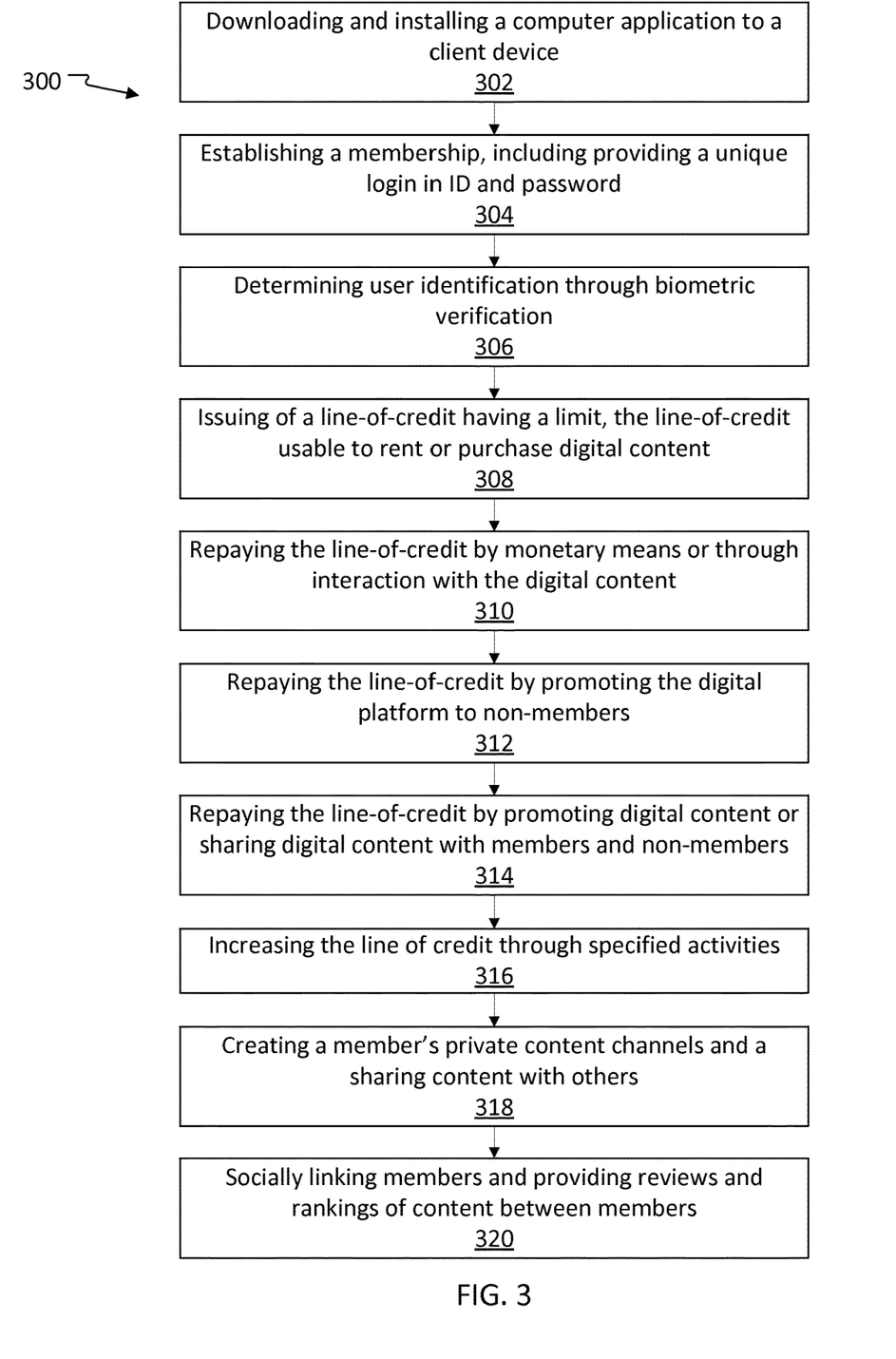
FIG. 3 illustrates a method for providing and operating the line of credit digital content application platform according to an example described herein.

FIG. 3 illustrates a method 300 for providing and operating the LOC digital content application platform 100 may further include the steps of a user downloading a computer application for installation on client 104 or client device 110, 120, 130, such as a computer or mobile device of any kind (step 302); establishing a membership by providing a unique login in ID and password (step 304); an optional means of determining the identification of the user through a form of biometric verification (step 306); issuing of a line-of-credit that has some limit and that is used to rent or purchase digital content (step 308); a means of repaying the line of credit by monetary means such as, but not limited to, a credit card, cash, PAYPAL Internet payment service, check, wire, or money order; alternative means of paying the line-of-credit through interacting with the digital content, watching or listening to digital content, making purchases, social networking (step 310); a further additional means of paying the line of credit by promoting the digital platform to non-members (step 312); a further additional means of paying the line of credit by promoting digital content or sharing digital content with members and non-members (step 314); a means of increasing the line of credit through various activities such as but not limited to paying off the debt accrued on the line of credit, promoting the digital content platform and/or content available on or off the platform to members and non-members, interacting in certain ways with the digital content, creating and uploading certain types of content, social networking the platform and/or digital content, completing surveys and/or exams and/or making purchases, providing reviews or ranking of digital content, creating menu or channel lists on the platform (step 316); a means of enabling a member to create their own private content channels and a means to share that content with others (step 318); and a means to socially link members and provide reviews and rankings of content between members (step 320).

The LOC digital content application platform 100 may recognize a variety of forms of credit for users. For example, such user credits may include digital credits, or activity cash, issued by the platform and earned by users for completing activities or other tasks as detailed herein, and applying the digital credits, or activity cash, to recharge or increase a user's line-of-credit. Additionally, a user may over-repay the user's line-of-credit, whereby the user pays through funds or completing activities in an amount in excess of the original line-of-credit extended to the user or in excess of the user's previous line-of-credit. Such excess is applied to the user's available credit within the LOC digital content application platform 100.

In another embodiment, intellectual property holders/content creators/IP libraries are provided with a premium marketplace on the LOC digital content application platform 100, where users dynamically price their own content, package their content, receive demographic data of other members across numerous categories, interact with members, and promote content that is on or off the platform to said users. The IP Holder/IP Library may receive full and dynamic control over per-unit pricing of their digital content, with no minimum price, with the LOC digital content application platform 100 set at a point allowing content to be priced below a predetermined amount, for example $1.00. The platform may provide the IP Holder with an IP Dashboard that enables tracking of digital content sales granularly down to a single item.

Intellectual property holders on the LOC digital content application platform 100 may set content pricing and packaging with no minimum price and the ability to sell to customer for any desired value, for example less than $1.00. The IP holders may receive data and metrics from numerous categories from LOC digital content application platform 100, including all metrics on the user, their device, consumption patterns, geo-location, and the like, and they are provided means to leverage that data through interactions and promotions with the members via Active Ads, social activities, and product sales. The LOC digital content application platform 100 provides a means for IP holders to promote their content, such as new book release, films at the box office, or current TV series on cable & networks. Such functionality of the LOC digital content application platform 100 reduces advertising costs for the IP Holder, as the expense of the Activities is paid for through archival content. In exchange for these benefits, the LOC digital content application platform 100 enables the IP Holder and content providers to cover the cost, or a portion of the costs, of the initial line-of-credit extended to users.

In yet another embodiment, users of the LOC digital content application platform 100 may directly communicate to intellectual property holders through messaging functionality and suggest or request pricing for digital content items, and propose content packages, as well as place Trigger Rental/Sales Orders. In one example, user A may request of a content provider that it drop its price by 15% and, if content provider agrees, user A may rent or purchase the content. The LOC digital content application platform 100 may allow other users to chime in on the suggested pricing. The LOC digital content application platform 100 may enable these users to place a trigger order for the content, such that if the content does reach that price point, then the content may automatically be purchased or rented and the user notified. The foregoing process may be timed: for example a user B may suggest to Paramount that the movie "Star Trek: Into Darkness" be rented for 0.75 cents or digital credits, a hundred other members agree to rent the film at the suggested price, and put in a trigger rental order if the price is met or is below that price over the next 39 days. If Paramount decided to grant that rental price request 20 days in, and then all the rental triggers are met. In this example, a hold may be placed on this amount on each user's credit line of 75 cents. Accordingly, payment may be guaranteed if Paramount met the trigger amount.

In another aspect of the invention is a method for demonetizing the distribution of content. This is achieved on the LOC digital content application platform 100 by issuing Digital Credits or Activity Cash to users' lines-of-credit for completing various Activities such as Active Ads, Social Activities, Recruitment Activities, Product Placement Purchases, Sharing Activities, and other means describe in various embodiments of the invention herein. Active Ads are Ads that employ standard Microgame mechanics, utilizing simple cause and effect, such as "Build-a-Block", "Bubble Pop", "Cut the Rope", or "Angry Birds". The ad requires the focus, attention and interaction of the member in order to drive the ad to completion. The ad may optionally provide a question or two to test the attention of the member and provide a bonus reward. In addition, such active ads may have a purchase opportunity, whereby users 114, 124, 134 may buy the product being offered. Social Activities are a selection of pre-packaged, but customizable, messages tailored to the particular social network and the product being promoted. Some messages may include links that allow their friends to buy products via the LOC digital content application platform 100. The amount of Activity Cash awarded will depend upon the number of people within their social network and may be determined by the business logic module 156. In operation, a user selects one or more of their networks to log into via the LOC digital content application platform 100. Such networks may include Facebook, Instagram, Twitter, Vine, Google Plus, and LinkedIn. When the user selects an Activity, the user logs into the network via the LOC digital content application platform 100 and selects the desired messages to transmit. Users select whether or not to use an Activity. If selected, the user demographics may or may not be used to determine what specific activities are offered to the user/member. Thus, if the user has selected to perform the Active Ad, that user is offered such ads based on their demographic data, thereby delivering to the user Active Ads in which the user is more likely to have an interest. Completing an activity earns the user Activity Cash that the user may use to increase their available line-of-credit. The activity fees for Active Ads and Social Activities may be divided at any determined proportion between the LOC digital content application platform 100 and the user. For example, an Activity pays 50 cents, 25 cents is paid to the user's line-of-credit account (as digital credits with the funds escrowed), with 25 cents paid to the LOC digital content application platform 100.

Shopping activities in the LOC digital content application platform 100 may be available to users at the end of Active Ads, as well as shopping opportunities that are placed over content through a merchant activity overlay. When active, a dynamic semi-transparent icon may be displayed on the client 104 or client devices 114, 124, 134 over specified objects in the video content, indicating they are available for purchase. For example, a user viewing Mad Men on client 104, or client devices 114, 124, 134 may purchase a couch, shoes, dress, or car viewed on the show, by selecting the desired product icon, the digital content will pause and an overlay will offer the user a shopping/purchase opportunity to get that item or one similar to it. Alternatively, the user may select the Product Icon, or press a key and store the shopping opportunity for later after the in-progress digital content is completed. Such option may be configured to not halt the playback of the digital content. In the case of Product Placement purchases, the corresponding merchant pays a fee on such purchases, and the fee is divided between the IP Holder over whose content the Product Placement is placed, the LOC digital content application platform 100, and the user. The user may not be issued actual cash but rather digital credits or Activity Cash equal to their share.

Such advertisements may not be a mid-consumption interruption forced on the user, nor are they attached to content. Instead, the LOC digital content application platform 100 offers users the choice of when, and even if, they want to interact with Active Ads. A user may select to not have advertisements displayed by the LOC digital content application platform 100. Advertisers pay a fee in real dollars for Active Ads that are completed by users, for Social Activities performed by Users, for product placements in content. Likewise, merchants may pay a transaction fee for real world products and services purchased off the platform such as through Active Ads and Product Placements. The LOC digital content application platform 100 also earns some transaction fee on all content that is purchased on the platform, unless it is purchased by Introductory or Recruitment digital credits. Funds that are paid by Advertisers and Merchants are split between the LOC digital content application platform 100 and the user (and in some cases also with the IP Holder whose content an activity is associated with such as product placement purchases). The member receives digital credits while the actual funds generated from the Advertiser or Merchant is deposited into an escrow account. These funds are distributed to the various Intellectual property holders and the LOC digital content application platform 100 as the member spends the associated digital credits on content.

In another embodiment, users may earn a portion of the revenue from Activities as a direct cash outlay instead of digital credits within the system. The portion of revenue available to the user in the form of cash may range from 0% to 100%, subject to the parameters set within the system, and may be paid to the user via a financial instrument such as PAYPAL Internet payment service, a credit back to a credit card, or a check. Alternatively, the payment may be distributed in cash, precious metals, or other instrument or form of economic value.

In yet another aspect of the present invention is a method for providing Introductory digital credits/Activity Cash to people who sign up to be members on the LOC digital content application platform 100. These digital credits determine the level of the initial Line of Credit of the new member. The new member receives a certain number of introductory digital credits for signing up for a membership to the platform and does so using an internet capable device that has not already been used to register a member. The member may receive additional digital credits for each additional device they associate with their membership.

In another aspect is a method for differentiating between Introductory digital credits and/or Recruitment digital credits that are provided to members when they join the LOC digital content application platform 100 or when they recruit new members and digital credits earned through Activities or through sharing content with members or other processes such as selling their own personal content. In this example the IP Holder does not earn revenue when a member purchases content using Introductory or Recruitment digital credits. The IP Holder in essence covers the cost of these digital credits in exchange for placing content on the LOC digital content application platform 100 and getting the user data and interactions with the member. The IP Holder is paid for digital credits/Activity Cash that is paid by members on content that was paid to them for completing activities, are rewarded for sharing between members or through other processes.

In another embodiment of the Invention, Advertisers are assured that members on the system are the consumers they want to reach by a method of matching the demographics of the member to the Advertisers specifications. The system may require the member to answer a series of questions the first time they wish to use Active Ad, as well as it may ask questions each time or by some other criteria. The advertiser will then offer to the member a range of Active Ads to the member that match the users interest and the Advertisers demographic wishes. The user may then select from the offer the Active Ads to complete. Similarly, Merchants may be provided demographic data to offer products that match members' interests and metrics.

In another aspect of the present invention is a method for rewarding a member for sharing or promoting digital content on the platform with non-members. As in the previous embodiment described above, if a member shares content with a non-member, the non-member may access the shared content for free by signing up for a membership. The recruited member receives the standard initial credit line with a specified amount of introductory credits, plus a bonus, for example, a shared content as a rental for free with no cost to their credit line (i.e., no subtraction to the member's credit-line for the shared item). In addition, platform 100 rewards the existing Users for recruiting the new member with some amount of RECRUITMENT DIGITAL CREDITS/ACTIVITY CASH. This Recruitment digital credit may be identified by the LOC digital content application platform 100 as additional Introductory Digital credits. The system differentiates these credits/digital credits/Activity Cash such that neither the IP Holder nor LOC digital content application platform 100 earns revenue from the spending of such digital credits. In the above embodiment, sharing of the platform content may be sent by physical or electronic means, including email, link, cloud drive, or any other suitable electronic means. The sharing notification may also be sent by a physical means, such as by physical disk, hard drive, or thumb drive.

In an aspect of the above embodiment a user may invite or seek to recruit new members by any means that LOC digital content application platform 100 can track. For example, the invitation may be via social network, email, link, text, voicemail or electronic communication means. It may also be by non-electronic means, known or presently unknown throughout the universe. For example, a member may send an invite by mail, with printed off code that when scanned or inputted enables the invitee to join and tells the system that this person was invited by that member. A member may invite a non-member verbally and when that member joined the system may ask this new member if someone invited him, and to provide the name of the member. A member may hire a plane operator to invite people, via sky-writing and, by providing an identifier for use by new members; the current member may thereby receive credit for inviting the new members who utilized the identifier when joining. If and by how much the member's line-of credit (LDCC) is credited with digital credits may depend upon a number of factors or combination of factors determined by the operators of the digital platform. The LOC digital content application platform 100 may impose an upper limit rule to the number of recruitment digital credits that a LDCC may earn in a given time period, or alternatively the system may impose no limit. The increase of the LDCC may come with additional perks, such as some discounts for future purchases or rentals, or even discounts on purchases and rentals outside of the digital platform.

In another aspect of the present invention is a method for rewarding a member for sharing or promoting digital content on the platform with members. Sharing of content between members in this embodiment of the LOC digital content application platform 100 is encouraged and designed to empower the crowd to promote content on the platform and drive increased consumption. The more a member shares content, the greater the reward. The process here involves a member sending content on or off platform to another member who then converts this share into a sales or rental transaction. The member receiving the shared content decides to rent or purchase it. Shared content that is not consumed—not rented or purchased, earns no reward. This is only content promotion. Some level of rebate in the form of digital credits is provided to the member who shares the content and convinces the other member to rent/purchase the content. The member who consumes the shared content may also receive a reward or value from the LOC digital content application platform 100 in the form of a discount on the purchase or rented content. Notification of content sharing may be implemented in a variety of methods; including emailing or sharing the content on a social network, or placing the content into a Members Private Library on the platform and creating a channel that has the content. Such sharing may be active or passive sharing. Users who promote content in the LOC digital content application platform 100 receive credits in response to other users consuming the shared content, and the sharing user thereby may receive sufficient credit to compensate that user for the value of the content. A member of the LOC digital content application platform 100 may earn more digital credits then that member spends.

In another aspect of the above embodiment, the LOC digital content application platform 100/system tracks all of sharing activity, identifying members who are particularly good at sharing certain forms of content. These members may opt to receive offers from Content Providers—Intellectual property holders—IP Libraries to get extra rewards for promoting content, even newly-released content in theaters, i.e. off LOC digital content application platform 100 content.

In an alternate aspect of the above embodiment, the LOC digital content application platform 100 may provide some reward to the Promoting member after YY members have consumed/converted the shared content, where YY may be any integer number from 1 to infinity. For example, YY may equal 3, and the Promoting Member may send the content to 19 people and 7 members consumed the content on the platform. In that scenario, the Promoting Member may receive 2 rewards, one for the first three, one for the next three, but nothing for the remaining one. If two additional members later consumed the content, then the one outstanding reward plus the two new members will total 3 rewards, and a third reward may be issued to the Promoting Member.

Let us add clarity to the previously disclosed embodiment of the invention, through further description with some examples. In no way do these examples limit the scope of the invention, they are provided to illustrate some aspect of the invention only. One aspect of the invention may include a version of the LOC digital content application platform 100 that may be accessed by members of the platform across multiple devices. For example, a member may access the platform via his smart phone, computer tablet, and through any browser on a computer. In some instances, access may be made through applications downloaded onto the device, such as an app on an iPhone, Android, or Microsoft phone.

In other instances, the application may be pre-installed on the device. The invention is not limited to existing devices, but applies to any and all devices that exist now or in the future that a user may access digital content on. For example, in the near future, car windows and in fact windows of all types may have heads up displays that allow users to see digital content, the platform may be accessed through such devices for members to access digital content. Another example of future devices that the digital content platform that is described by this invention is digital display clothing, walls, floors, furniture, appliances, and the like. In another example, Google Goggles and other overlay devices that allow users to perceive the real world and digital content may be employed within the present invention. The invention here is applicable to such systems and many types of digital content may be accessed through this platform. For example, a user of a digital device through the platform may consume content associated with the real world environment the user is seeing through the device and/or digital content that has no connection to that environment; or some combination thereof. A concrete example here may be helpful.

For example, a user Sam is a member of the digital content platform. Sam may sign in to the LOC digital content application platform 100 via his membership ID and Password or a biometric too. Sam may be in Paris, observing the Eiffel Tower, and he may make a selection in the LOC digital content application platform 100 to watch an overlay video on how the Tower was built through his Google goggles, through which the display device displays content overlaid on the tower. Same may also listen to audio music that is not associated with the tower. For the delivery of the foregoing content through the platform 100, Sam's account may be debited 3 digital credits. User Sam may additionally select with the platform 100 to consume an interactive commercial related to nearby restaurants, and in compensation for consuming the commercial Sam's line of digital content may receive 2 digital credits. If Sam also interacts with a Beer Ad and a Feature Ad through the platform 100, he may earn 3 more digital credits. If Sam then makes a purchase on the platform for movie tickets for a film with a credit card that is located at a nearby theater, Sam may receive 2 more digital credits. In this example, Sam's credit line is increased by a net 4 digital credits.

In another example, a user via a mobile device or computer may initially signs up for a membership with the LOC digital content application platform 100. The user may interact with the digital content platform 100 through a browser or through a downloaded application to create the membership. The LOC digital content application platform 100 identifies the user's device as having not been used by any other user and therefore determines that the new user's device is approved and therefore approves the membership for the user. Identification of the new user's device is captured by the platform 100 and linked to the user's account. The LOC digital content application platform 100 employs a process for transferring the identified device to be connected another user's membership if the original user no longer uses the device in connection with the original user's account. The LOC digital content application platform 100 may require that only one account be created per device, or the platform may allow multiple accounts to be created per device. The content application platform 100 may optionally impose upon the line of digital content credit a time limit for using the credit extended to the user. The LOC digital content application platform 100 may grant an introductory Digital Content Credit to the user. The amount of introductory digital credits issued may vary from user to user as determined by the platform 100. Factors for determining the initial amount of introductory digital credits issued to a new user may include whether the new member was invited by an existing member, whether the new member responded to a specific offer, the level of credit of the existing member who invited the new user, or the number of devices the new member is associating with the account.

Once a user is a member, that member may access digital content that is available on the LOC digital content application platform 100. The member's Line of Digital Content Credit is debited or credited depending on how the member interacts with the content or platform. On the platform digital content is assigned various positive, negative, or zero values depending on how the member interacts with it. The following examples are for illustrative purposes only and do not limit the scope of the invention in anyway. In Example 1, a member Alex34 has a LDCC credited with 30 digital credits. Member Alex34 wants to watch certain video content, such as a movie. Member Alex34's account is debited 3 digital credits in exchange for delivering the movie to him via the platform. Later, Member Alex34 decides to buy a book, which he selects and for which he is charged 1 digital credit. The book may include content associated with a product purchase desired by Member Alex34, and the platform 100 allows Member Alex34 purchase the product with a credit card or other payment instrument. The platform credits Member Alex34 5 digital credits for the purchase. Alex34 may select to watch an Active Ad that promotes a beverage, and the platform may credit him with 1.5 digital credits for consuming the ad. Member Alex34 may send a message about the ad to other users, and the platform awards him another 0.5 digital credits.

LDCC may be debited a certain amount and then paid off or down. In an alternative embodiment, the LDCC is always a positive value. The LDCC is initially charged with a given amount of Introductory Credits such as introductory digital credits. When the value of the LDCC reaches zero, then the user may no longer rent or purchase content. In this case, the LDCC acts like a pre-paid credit card or gift card account. At any time the user may recharge the LDCC with a financial instrument or by earning digital credits through Activities or recruiting new members or adding additional devices. The system may place a limit on how high the LDCC may be charged up, or it may have no limit.

In another embodiment of the invention, scoreboards and crowd social dashboards are used to encourage users to drive up the amount of credits in their LDCC. For example, a member Mocha3PO may have been a member for a few years, and has LDCC 50 digital credits. If user Mocha3PO sees that other members who are fans of "The Walking Dead" have much higher limits, user Mocha3PO may set about performing activities until he has 1204 digital credits in his LDCC, making him the number one ranked credit line of "Walking Dead Fans". For Mocha3PO, building up a substantial positive balance is a game and provides the member with independent entertainment value. The member has selected to belong to a score board in the system, and is proud that he is in the top ten of members with the most credit balance. The member's high balance earns him praise from other members and gifts from some of the systems venders.

In this invention, the Line of Digital Content Credit may be charged up to any level as was illustrated in two of the examples above. It may be increased by certain activities. A member may start with a value of XX digital credits, and then increase that LDCC through various Activates. As illustrated in the foregoing, a member's user of the digital content/digital credits determines whether the member is debited or earns additional digital credits. For example, member Alex34 may watch a movie and his LDCC is debited 3.45 digital credits, but then Alex34 posts a pair of shoes that he sees on a social network, which earns him 5.3 digital credits.

In another embodiment of the Invention, members may consume digital content on or off line, as long as they have enough digital credits/Digital Credits in their LDCC. Although content must be selected from a device that is connected to the web, content need not be viewed while online. If a User purchases/rents content, a copy of it may be downloaded to a device authorized by application platform 100. The system will recognize that the content is owned or rented by the member and they may play it offline on any device registered within the system. This encourages a member to register their devices so that their digital material is keyed and accessible offline.

A member also has the option of selecting content that they may want to watch offline. If the content has an associated cost, the amount is subtracted from their line of credit (LDCC). If the member does not watch the content, they may go online and restore their credits by removing the unviewed content. The system checks to see if the content was consumed (watched, read, listened to, interacted with) and if it was not consumed, then the credits are returned to the members account. Again this was illustrated above with Janet&6.

In one embodiment of the invention the Line of Credit (LDCC) lasts indefinitely. Accordingly, a member who signs up and watches one film or reads one book, and then does not do so for another day, week, month, year, or decade does not lose their account or associated Line of Credit. The user may return to the platform and consume other content with that LDCC anytime of the future. In this example, the user's membership is perpetual and does not expire. Alternatively, the operators of the platform may set rules requiring members to use the LDCC or have it decreased or debited for non-use.

In one embodiment the LDCC is granted without requiring any collateral or financial instrument such as credit card, debit card, social security number or other means of identity or payment security instrument. The platform may require a unique device. This embodiment provides a LDCC to all members and is based on an honor system. A member may continue to consume content without payment or Activities until all the credit in their LDCC is consumed. For example, if a new member is provided with 30 digital credits in their LDCC, that member may consume all 30 digital credits and is not required to ever pay it back. The system exhibits calculated reliance that the member will recharge the LDCC and consume more content from the LOC digital content application platform 100 (system), but does require members to do so. The calculated reliance may be derived by the system 100 based on a variety of factors as disclosed herein. Once the LDCC is used up, the member is not able to consume any more digital content that costs digital credits, until the line of credit is recharged either through activities or a financial instrument. This may be done by a variety of Activities as detailed in the other embodiments. This includes consuming digital content that generates positive credits, interacting with digital content via Product Placements, Active Ads, Social Activities, recruiting new members, sharing content with other members and convincing them to buy or rent that content, creating certain content that is uploaded and consumed by other members in a way that earns this member digital credits, making payment with some financial instrument such as PAYPAL Internet payment service, credit card, debit card, gift card, check, money order, wire, cash; or even, other activates such as ranking, reviews, creating menus or ranking boards.

In an alternative embodiment of the invention, the LDCC does require a financial instrument or identifier to be provided such as Social Security Number before the LDCC is issued.

In another embodiment of the invention, a membership requires a unique device that has not been associated with another member in order to obtain a membership and the LDCC associated with a certain level of introductory credits. In this embodiment the User must use a device registered to their account in order to access their account from that device and consume content. The users may associate as many devices as they want to the account. The users may receive a reward for each additional device they associate, earning for additional introductory digital credits for each device they associate with the account. A member in this embodiment may be required to sign up from a device that has not already been used by another person. For example, a user having a tablet computer may download an application that connects to the digital content server. That user provides a unique membership ID and password. The system accepts the user's membership because tablet is not associated with any other user. Later, another person picks up the tablet and tries to create a new membership. However, the platform may the membership request because the tablet is already identified as being connected to a member. The system may allow existing members to log into the platform via any device and consume content, or it may be set so that only devices associated with the User's account may be used to access content.

In an alternative embodiment of the invention, a person is not required to provide a password and/or membership ID when signing up for a membership, instead the device's unique aspects such as chip ID acts as the identifier and the device itself becomes the member with a LDCC. In this case, any user may use the device and is not required to provide a login or password. Alternatively the device may be the member, but the platform may also allow a membership ID and Password and/or biometric for human members who want to access their accounts and LDCC.

In yet another alternative embodiment of the invention, a person must initially sign up for an account through a mobile device that the content platform may identify as unique. In this embodiment, after a user signs up via a device that the system identifies as unique and not being used by another member, that member may then access the platform via any other device via their membership ID and password and/or biometric. For example, in this embodiment, a user signs up via an application downloaded to user's tablet which has a unique chip and other electronic identifiers that the platform may detect. The user becomes a member and is issued a LDCC. That user may now access the platform as a member via any of other computer and mobile device that they own or is owned by others anywhere in the world.

In another embodiment of the invention, a user may select from various types of memberships or earn levels of membership. A member that simply signs up for a membership may be granted a Class A membership, but a member who signs up and provides the LOC digital content application platform 100 with a credit card, may be granted a Class B status. Other members may move up in rank depending upon how many people they recruit to the system, how much content they consume, the type of content they consume, or by any metric or activity the operators of the digital content platform desire. For example, members who have earned a 100 digital credits or more digital credits by completing Activities may be granted a Premium Class ranking, while members who purchase such a balance do not. Members may also be able to influence the ranking of other members depending up the number and/or type of activities they complete. For example, a member who creates and shares content with other uses, may receive points from those members that eventually cause the member creating the material to rise in Membership Class as well as increase that members LDCC. The type of membership may effect one or more attributes of that membership, and may include but is not limited to the size of their line of credit, how much content the member may consume or how many digital credits the user may earn during a certain time period, how much is charged for content or how much is earned for performing certain Activities on the LOC digital content application platform 100. Different memberships may allow certain purchases and forbid others. For example, age restricted accounts may allow only rated G content to be consumed.

One embodiment of the present invention is a method for debiting or earning digital credits when consuming digital content. Each digital content, such as but not limited to a book, motion comic, video, audio, game, virtual overlay, digital smell, digital sensation, or image is assigned a unit value. This value may be positive, negative or zero. This value may depend upon whether the digital content is to be rented (such as accessible for a given time period or number of viewings or some other metric associated with renting) or purchased (as in owned with limitless access with regard to this members consumption of that content). The value may also depend upon the ranking or status of the member. A piece of digital content that costs 2 digital credits to rent and 4 to buy by a Class 1 member, may cost 1 digital credit to rent and 2 to buy by a Class 2 member, and be free to rent and cost 7 to buy by a Class J member. The cost in digital credits or digital credits for consuming the digital content may also depend on any other factor the operators of the platform designate. For example, the cost in digital credits may depend on the history of the member, the number of members recruited by that member, the number of members recruited down the chain of people that member recruited, the content consumed by members that member recruited, the level of social activity, the popularity of the content, the location of the member, other attributes of the member or how the member uses the system. The cost may be designated by the creator of the content or set dynamically by the system. In short, the value may be fixed or change by any number of factors, including by random factors programmed into the system.

Another embodiment of the present invention is a method for debiting or earning digital credits based on how members interact with the digital content. The positive, negative, or zero effect an interaction has with a piece of digital content depends on any number of factors and may vary in any manner that the operators of the platform have programmed into the system. The same interaction may have different positive, negative, or zero effect on the LDCC, depending upon these factors. The LOC digital content application platform 100 may be configured to weight the factors that determine the value of the interaction in accordance with the desire result, and the factors may be personalized, varying from member to member, as well as vary for the same member in different contexts. The value may also vary by content, by time of day, by any combinations of factors. Some digital content may debit or credit a member's LDCC by watching and/or listening and/or interacting with it. Some content may cost digital credits or be free (cost zero) to watch and/or listen to it, but earn digital credits for interacting with the content. For example, a piece of video content that is an advertisement cost zero digital credits to watch, but if the member interacts with it in some manner digital credits are earned. In another example, a member debits his line of LDCC by 2.4 digital credits to watch The HOBBIT movie, but interacts with it, making a purchase connected with the movie and earns 2 digital credits that is credited to his LDCC, and then he tweets about the film (logging into his account via the platform and selecting one of several pre-packaged tweets about the film) and earns another 2 digital credits that are deposited into his LDCC. The net result is that he adding a net 0.6 digital credits to his LDCC. Through the platform members may thus interact with the content in various ways; these interactions may result in debiting or charging up the LDCC, or may have a zero cost to the LDCC. The negative, positive, or zero cost incurred to the LDCC may depend on the type of content as well as the type of interaction. The value attributed to an interaction with the digital content may in fact in this invention depend upon any number of factors, and vary from member to member, as well as from second to second. Thus, the same interaction by the same member with a piece of digital content may vary depending upon factors set up by the operators of the digital content platform.

Additional examples are provided herein. In Example 1, member Samuel98P reads a digital book. The digital book has several available interactions, one is shooting game, another is Facebook posting option, still another is promotion option to other members and to non-members, and still another is purchase option of branded clothing corresponding with the book, and still another is an Active Ad about the upcoming movie adaptation of the book. Samuel98P selects the option of posting on a social media service, and earns 1 digital credit to his LDCC. Then he uses the option of a shooting game, which costs 0.5 digital credits, then he uses the shooting game option again, but it does not cost any digital credits. Exactly why it cost the first time and not the second may depend on any reason that the operators programmed into the system. The second interaction of playing the shooting game may be free because of random factor built into the system, or because someone responded to Samuel98P post to a social media network about the book, or because of the score he received in the first shooting game, or because someone he invited to join, became a member, or because some other condition was met that triggered this change. It may be all of these things or none of them. The next day, Samuel98P plays the game a third time, and it actually earns him 1 digital credits. Again, because some value in the system was triggered.

In another embodiment of the invention, members are rewarded for the members they recruit, as well as the members these new members go on to recruit. One means is that the system may keep track of each member that was recruited by another member, and reward that member for actions made by the new members. For example, member Adam001, recruits Eve002, Roger002, Mike002, and Steve002. He does this by sending out an invite to 100 people, and these 4 respond and join. His LDCC balance increases from 30 digital credits to 48 digital credits. Later, Eve002, recruits Jeb003, Larry003, Sarah003. Eve002 is rewarded for these three new members, and her LDCC balance increases from 30 digital credits, to 36 digital credits. The system also rewards Adam001, providing him with 0.5 digital credits for each new member Eve002 recruited. The depth of tracking may be as long or as short as the operators of the digital platform desire. For example, tracking may stop at Eve002 or continue on indefinitely, so that when Victor0239 is recruited by an existing member who is recruited through a chain of 488 members that leads all the way back to Adam001, Adam001 receives an increase in LDCC or other type of reward.

In another embodiment of the invention, a non-member must join the digital content platform by providing a unique email address and/or unique bio-metric such as finger print, image, video image, eye print, or some other metric that unique identifies the person.

In another embodiment of the invention, members are identified by a front facing camera on a mobile device or computer. When the member first joins, the system takes a video image or series of stills of the person as they move their head or read a phrase or perform some combination of actions with their head. The application records that and uses it for future identification. When a member signs in, the system then uses face front camera to capture video or series of images to confirm the identity of the member. This may be as simple as a single image, or as complex as a video comparison of the member with him moving his head and saying certain words. They system then may use the front facing camera to determine if a User is paying attention to Active Ads and only reward them with digital credits for staying focused on the Active Ad as well as completing the activity contained within the Active Ad, such as popping bubbles to spell out Buy Coke.

In another embodiment of the invention, a member may create sub-accounts for friends or family and share a line of LDCC. The member who creates the sub accounts is the Master Member. The Master Member may create any number of sub-accounts and assign a portion of his LDCC to each sub account. Each sub-account member gets their own membership login and password but has a limited amount of credit they may withdraw from the LDCC, which is determined by the Master Member.

The Master Member may be able to set limits on the type of content or even when the digital content may be accessed. The Master Member may be able to monitor the content that is consumed. Each sub-account member may consume digital content as well as complete Activities, recruit new members, and share content. If a sub-account member reaches their sub-account credit limit as set by the Master Member, they may no longer consume digital content until paying off that debt by monetary means or any of the Activities previously described that members may use to earn digital credits. The LOC digital content application platform 100 may be configured such that sub-account members may not exceed their sub-account LDCC, but such sub-account members may generate as many digital credits as desired.

In one example, a user named Pam has a LOC digital content application platform 100 account with and her LDCC has a balance of 40 digital credits. Pam decides to create sub family accounts for Mike, her husband, and her three children. Mike receives a sub-digital credit line with 10 digital credits, and each of the three kids receives a sub digital credit line of 5 digital credits each. This arrangement leaves a LDCC having a balance of 15 digital credits for Pam. In the event user Mike expends all his credits in the first day, but he also interacts with multiple Active Ads that earn his account 23 digital credits. User Mike will then have 23 digital credits, which is more than the 10 digital credits he began with. In furtherance of the example, Pam's children expend all of their digital credits in a few days. The children may pay off their debt by interacting with Active Ads or Social Networking products within the LOC digital content application platform 100. Alternatively, the children may request a credit balance transfer from user Mike, and through a request to the LOC digital content application platform 100 Mike may transfer and assign some or all of his balance of digital credits to the children's accounts.

A further attribute of the above embodiment of the invention, is that the creator of the sub-accounts may create restrictions on what sort of content the sub-account holders may have access to. For example, the Master Member may want to restrict content that is religiously objectionable to her children, or of a sexual nature. Each sub-account may have its own unique restrictions selected by the Master Member, or the Master Member may apply the same restrictions to all. In addition, there may be more than one Master Member, for example Mike and Pam may both be designated as Master Members.

In another embodiment of the invention, the digital content platform has two or more digital content channels with Premium Content. Access to the different channels is determined by the system based on one or more factors that may include but is not limited to the type of membership, achievements made by the member, member ranking or other attributes, the level of LDCC, the debt or positive balance of a member's LDCC.

In another embodiment of the invention Premium Content is divided into various Premium Marketplaces on the platform. Access to the various Premium Marketplaces then depends on various factors. These factors may include but are not limited to the members status, the type of membership, the ranking of the member, some personal identification factors attributed to the member such as age, race, sex, religion, outside factors such as the location of the member in the world, the amount of credits in the user's LDCC, and/or number of people that have been recruited to the system by the member. Access may depend upon charging a fee to the member's LDCC, in order to access certain Premium Marketplaces for a given period of time (which may be any length of time). Access may be determined by other members, or by the action of other members.

In another embodiment of the Invention, users are each provided with a Member Content Library (MCL). The Libraries allow users to store their own content. The storage space for this Member Content Library may reside content server 162, in the user's personal cloud storage subscription service server, on the member's device or devices, or some combination of the foregoing. A user may store their own content, and content that was rented or purchased by that user within the LOC digital content application platform 100 system, in the MCL. To prevent piracy the system may run all uploaded personal content through an IP Signature process, whereby the application platform 100 compares each file against an IP Signature gold master database to ensure that the content is not copyrighted material. In addition, a second check may be run against the available databases from international law enforcement agencies to ensure that child pornography or other illegal or harmful content is not stored within the Members Content Library.

Another embodiment of the invention involves Member Content Libraries that come with a complete feature set of content search and presentation tools to organize and enable Users to distribute content via their own content channels. To be clear Members are not allowed to upload content in the Premium Content Marketplace, but instead may create their own content channels. These channels are private. For each channel the member may designate and/or invite whom they wish to have access to that channel. In this way the channels are similar to private Facebook or Google Plus accounts, in that only members who have been invited by the Channel Creator may access or even see the content. Members may designate layered or nested access to their channel, so that some of their friends may access all the channels, while other content may only be accessed by a subgroup of those friends. They may also create completely different groups for each channel.

By placing the content into channels that may be interacted with, ranked, commented upon, and promoted via various activities A CONTENT SOCIAL NETWORK is created with personal content that is different than the social network experience provided by Facebook, Twitter, YouTube, and Instagram.

In another embodiment, LOC digital content application platform 100 receives users' demographic information and direct search inquires. Responsive to the information and search inquiries, the platform offers to users targeted entertainment content choices and advertisement content choices. The user may select from the Advertisement content and, as the user consumes the content, earn positive credits select entertainment choices that expend credits. Further, the user may populate a desired section of advertisements, the value that may be earned by the user for consuming each of the Advertisement content is displayed, allowing the user to selected specified advertisements and earn the associated value.

In an additional aspect, metadata may be collected as users consume advertisement content. For example, when a user enters a search, such as a specific mobile phone, data relevant to the searched phone is populated in a data sheet, and as the user consumes more phone advertisements, the system creates a comparison of the searched devices and displays the comparison to the user, including the prices and a selection for the user to buy one of the devices. Such intelligent advertisement consumption earns the user credits and also collects the data the advertiser has placed in the advertisement. The LOC digital content application platform 100 collects a fee from advertisers for each advertisement consumed and then divides the associated fee between the system and the user. The user may be issued an actual cash credit or a digital credit, thereby paying a user for performing searches rather than a platform such as Google.

In another embodiment of the invention, Members invited to a User's Channel may Comment, Recommend, and provide all the same feedback that is possible within the Premium Marketplace.

In yet another embodiment, a Member may create open Content Categories, where members who have subscribed to their channel may add content, in addition to simply consuming it. Groups of members may also choose to create a shared channel that they may all add content to, and then invite other members who may only access that content. Any combination of access is possible providing members with access to deposit content and access it.

In another aspect of the invention, members may place content that they are renting or have purchased into their channels. If other members seek to access this material they may do so, and may receive a discount on the content should the second rent or purchase it. In one embodiment, the second user may only consume the digital content if the sharing is converted into an actual transaction to purchase such content. The first member, who is sharing the content, will then also receive some level of rebate on each member who converts the share into a purchase or rental of the same content.

In another embodiment of the invention, members are allowed to create a certain number of channels for free, and then are charged a fee to create additional channels. The number of private channels and amount of content offered on them may depend on any number of factors, again as determined by the system.

In another embodiment of the invention, a User has the option of assigning a base fee that is positive or negative (or zero) on the content in their private channels. Members who consume the private content are then charged a fee for this content which is subtracted from their LDCC. Members receive the base fee on content that is positive (e.g., costs other members credits), and pay out credits from their LDCC on content that is negative. The negative content cost items may be Ads or other materials they are seeking to promote. Users in this embodiment are able to make Activities (ads/social/shopping) and disburse credits to other members when said Activities are completed.

In another embodiment of the invention, only select members may create private channels and charge fees while others may only offer channels that have free content. Exactly how that determination is made, depends on how the platform has been set up to measure which members do and don't have such a privilege. The layers of private channels is also numerous and has unbounded scalability.

In another embodiment, private content maybe selected by the platform to be advanced to the Premium Marketplace or to an Independent Premium Channel. The system will identify popular Member Created Content an offer that Member the option of moving their content into the Premium Marketplace or an Independent Premium Channel. This transition is done only after invitation from LOC digital content application platform 100, and at the member's discretion. Such content may then generate digital credits or even actual cash for the member. Any number of Independent Channels may exist, one to infinity.

How content is selected to advance to an Independent Channel or the Premium Marketplace is set by any number of factors, including but not limited to the number of members who access the content, the popularity of the content on and off the system, the popularity of the member, and/or the ranking of the content by members. The creator of the content may receive some benefit to their LDCC, and/or be provided some monetary reward, and/or social or ranking benefit. For example, the system may be set to detect when a certain number of members have accessed private digital content, such as a digital book. The system then contacts the Member and asks if that content may be provided as Premium Content to members not in the Member's private channel IF the Member agrees. The system or the member then sets a charge for the content, and then receives a share of the fee collected, crediting to their LDCC as digital credit or be paid in actual cash paid out via PAYPAL Internet payment service or some other means such as a quarterly issued check to the member. In a different example, the system does not ask the permission of the creator, but decides based on certain factors to select the content and offer it to some or all other members as Premium Content.

In an alternative embodiment of the invention, a private content channel may be created by two or more members, and these co-creators of the channel may invite members to the private channel, upload content, and set rules for how the private channel operates on the LOC digital content application platform 100, within the set parameters allowed by the system. The users may determine whether other members may access content on the channel and who may access the content on the channel, what content may be uploaded to the channel, and what fees, if any, will be charged to the line of credit of other members who consume the content. Levels of control also be determined and set by the co-creators. For example, two members may have rights to upload all content, and five other members may upload content but only if one of the other two members agree to such actions. Other variations of such permissions are with the scope of the present invention.

In another embodiment of the invention, members may access some or all digital content for a period of time with a fee charged against their line of LDCC. For example, there may be various channels of content, and an option of having access to all of it for a month for a set number of digital credits charged against the LDCC may be offered to one or more members.

In another embodiment of the invention, the value charged to a member LDCC for consuming or interacting with content is set dynamically by one or more factors. These factors may be random, be based on actions of one or more other members, or be based any number of other factors the system keeps track of. The value may also just be dynamically set by the creator of the channel.

In another embodiment of the invention the digital content platform acts as a school, wherein some of the content is exams and other content is lessons. The LDCC for each student, and what content they may access may depend on how they perform on each exam element, and accessing lesson content depends on how well they performed on the exam content and what previous content has been accessed. The system also provides a means for issuing certificates and diplomas. The system may issue digital credits based on scores or lessons complete or overall grade earned by the student (member). In this embodiment, all the students may have their own memberships, and be invited to an education channel created by their teacher. The tests, lessons, assignments maybe activities that pay digital credits (zero to any value).

In another embodiment of the invention, members may modify premium content and upload it to their private content channel. The charge to a member's LDCC may include a fee for altering the content, as well as any number of other fees set by the system and the member. Some or all content may be available for modification. A member may be able to modify the content but not share it with other members, share it with all members, or just a select few.

In another embodiment of the invention the system provides a means of tracking the credits a piece of content earns or debits and then charge a financial amount to the owner of that content. The formula for calculating need not be linear and may be complex, and differ for each and every piece of content. For example, one piece of content may earn a member 1 digital credit for watching it and interacting with it; e.g., it is a private Active Ad. The owner of the content may then be charged an amount for that 1 digital credit. The amount may be fixed, for example $0.01, or the amount may be tiered based on number of members who access the content. For example, $0.01 may be charged for each of the first thousand members to access the content, and $0.0024 may be charged for each of the next twelve hundred members to access the content, and $0.0010 may be charged for all further members to access the content in the same week In exchange for one week of access to a video game called Mocha's Revenge, the system may debit members 3 digital credits. The owner of Mocha's Revenge may receive $0.02 per 3 digital credits, or $1.00 for every 99 digital credits charged to members for such weekly access.

In another embodiment of the invention, the system only has private member channels and content, and no Premium Marketplace exists on the platform. Access to the content is determined by the content creator and/or by one or more members and/or the digital content platform, or by some combination of the content creator, members, and/or digital content platform.

In another embodiment of the invention a means is provided that enables members to place one or more pieces of digital content into the Premium Marketplace and/or Channels not created by the member. The LOC digital content application platform 100 may force one or more requirements to be fulfilled before such content is placed in the Premium Marketplace (or Premium Marketplaces) and/or Channels not created by the member. For example, the system may require a fee that is debited to the LDCC of the member seeking access to certain private channels; the system may only allow members who have achieved some rank before they may upload content to channels not belonging to the member. Alternatively, the system may allow content that generates debt for the member on his LDCC to be placed on certain non-private channels, such as a User's Active Ad Channel, but not content that generates positive credits for that user's LDCC. For example, a member, Jerry47U, who creates a film and wants to place a trailer on a Trailer Channel in the system or in the Advertisement Premium Content Channel, and pay from his LDCC 0.25 digital credits to each member who watches and 0.40 to those who watch and then request membership to his private channel he may do so. Jerry47U may then charge members who come to his private channel and watch his movie.

In another embodiment of the invention a means is provided in the platform that provides tools for members to create and/or modify digital content and/or add interactivity to content. The system may provide tools for a fee that is debited to the members LDCC, or limit access to certain members. Alternatively such tools may be free or even generate positive digital credits to the member's LDCC. The use of the tools may be limited to their own content, or under some conditions set by the system, enable a member to alter and/or modify content not uploaded or created originally by them. Such content may be placed on their Private Channel or be available outside of their private content channel based again on criteria set by the system. Depending upon what tools are used and how they are used a member may have their LDCC credited or debited. For example, member Raylokoko likes to combine video game elements to movies and then mash them up with motion comics. Raylokoko pays a small fee to do this and then stores the creations in his Membership Content Library, and then shares this with his friends on one or more of his private channels. Members who access this content are paid a fee that goes in part to the IP Holder of the copyrighted material, and a portion of the fee is paid to the LOC digital content application platform 100 as a transaction fee, and a percentage to the Raylokoko.

In another embodiment of the invention a means is provided in the system that gives developer kit to one or more members. Through the developer kit members may create tools that allow content on the platform to be modified. These tools may be new editing features and/or content creating tools and/or interactive tools. These new tools may be usable only to them or to one or more additional members. The creator of the tools may be charged a fee to their LDCC to access the developer kit. Access to these tools by other members may be charged a fee against their LDCC. A utility of this aspect of the invention is that members may build upon the digital content platform, adding new plugins or tools that other members may use to improve or alter existing content on the platform and/or create entirely new content.

In another embodiment of the invention a means is provided by the digital content platform that informs members about the various channels available on the platform and some information about the content on those channels. The information may include details on private channels, as well as channels created by the operators or owners of the digital content platform. Members who create private channels may be able to determine if their private channel is listed and what information about the content or members is viewable by other members. Alternatively, the system may make that determination. A fee may be charged to members to keep their private channel or channels from being listed to other members, or they may receive digital credits for allowing a listing. A further means may be provided for members who see a private channel and may like access to it, to petition member who created the channel for entry. A fee maybe charged to petitioning member's LDCC by the system and/or the owner of that private channel for entry to the private channel. The fee may be divided between this private member and the LOC digital content application platform 100 (e.g., a transaction fee may be added). Members may also pay a fee or petition or perform some other task to gain admittance to private content channels.

In another embodiment of the invention a means is provided wherein a member with a positive balance on their LDCC may exchange this positive balance for a monetary payment and/or content not on the digital content platform. For example, a member who has a LDCC with 8500 digital credits. This member wants to cash in their extra digital credits. The system offers to purchase the 300 digital credits for some monetary value, for example $30. This amount is paid to the members through any number of means such as through the members PAYPAL Internet payment service account, credit card account, bank account, or a check sent to the member. The system may purchase some or all of the positive balance of digital credits. Alternatively, the system may offer a means for the member to sell all or some of their positive balance to other members. For example, member Boy*K, has built up a positive balance on his line of LDCC of 984 digital credits. The system offers member Boy*K to sell his digital credits to other members. Member Boy*K puts his digital credits up for sale for $1 USD for each unit, no one buys them, but several members offer to purchase them at smaller amounts. Member Boy*K accepts some of the offers, selling 300 digital credits for $50 USD to Member hhkle88i, and 78 digital credits to Member HotG&D for $22 USD. A third member offers an autographed baseball for 30 digital credits, and Member Boy*K accepts. Per this example, it should be clear that members may negotiate and/or bid on the digital credits. Furthermore, digital credits may be sold or traded for monetary or non-monetary items.

In another embodiment of the invention the price of digital content depends on dynamic factors such as the number of members who want the content, the amount of digital credits bid by one or more members, the type of content, the status of the members, and any other factors programmable into the system. One implementation of this is given by the following illustration. Members select content that they want to consume and offer to pay from their LDCC a certain number of digital credits. The system tracks the offers, and when one or more condition is met, the digital content becomes available to those members. The system may accept the offer of one or more of the members or groups of members. For example, 80 members offer 3 digital credits each for the game, THE HOST—NEWTONS REVENGE, 48 offer 5 digital credits for the same game, and 8 offer 6 digital credits, and 493 offer 2 digital credits, and 887 offer 1 unit. Based on criteria programmed into the system, it accepts the offer from the 80 for 3, the 48 for 5, and the 8 for 6 and rejects the other offers. In another aspect of this embodiment of the invention, a digital book is offered to all members once 4000 digital credits are paid for that digital book. Various members offer amounts to obtain the digital book. When the 4000 digital credits are reached all members who paid and/or all members on the channel and/or all members get access to the digital book. In yet another illustration of this embodiment, digital content may be bundled and the bundling may include non-digital content. The system or the content creator or both may determine when an offer is accepted. This acceptance may by static condition, programmed in before members make submissions on what they are willing to charge to their LDCC or dynamic set as offers come in.

In another embodiment of the invention content creators may post digital content on the platform 100 that describes other content that they intend to create and offer both on and off of the platform. This is an advance sell option, which occurs when digital content or physical content is proposed to be exchanged for payments from members LDCC. Users view proposals on such content, such proposals themselves being digital content and then may place pre-orders for that content. The pre-orders place a hold on that amount of digital credits in the member's LDCC. Once some criteria is met, such as the delivery of that content to all the members who have pre-paid for the digital or physical content, then content creator receives some portion of the payment. This payment may be in cash or in digital credits. The LOC digital content application platform 100 receives its portion of the cash paid, and if it pays the creator in digital credits it may escrow the equivalent dollars. If the content is not delivered by some time limit, the pre-sales cancel, and the digital credits debit from the members who made the pre-purchases is credited back to their LDCC and the hold is released.

In another embodiment of the invention members may gift their positive balance of digital credits on their LDCC to other users. The system may take some percentage of the digital credits that are being credited to other members.

In another embodiment of the invention, a user LDCC may be charged an inactivity fee if a certain amount of content is not consumed over a given time period, such as a month or year. The change in digital credits is subtracted from the LDCC.

In another embodiment of the Invention, users may earn digital credits by visiting and/or purchasing products at a physical store. In this embodiment, Merchants place a Physical Shopping Activity on the system. Using the same demographic metric matching, Users who meet the merchants' desired demographics are then offered this Physical Shopping Activity. If the User opts to select one or more of these Activities, and then visit the store they may earn digital credits—based on the user visiting the store location while caring one or more of their registered devices that has GPS chip or other location determining electronics. This Activity may reward the User for just visiting the store and spending a certain amount of time in the store. Alternatively, the Activity may require the User to make a purchase. In which case, the Merchant is provided an App that generates a confirmation code or inputs one the User is given by the LOC digital content application platform 100. In this manner, the Digital content platform is able to drive physical visits to merchant locations and sales. The User is rewarded for making the purchase in digital credits and the store benefits from increased foot traffic and/or sales.

Other applicable implementations of the LOC digital content application platform 100 and attendant network configurations may be included within the scope of the presently described platform. Although examples were provided, it will be understood that they are non-limiting and other configurations are available within the scope of the invention. The embodiments described above may be implemented in one or a combination of hardware, firmware, and software. The following claims are hereby incorporated into the detailed description, with each claim and identified combination of claims standing on its own as a separate example.

What is claimed is:

1. A method for access to a digital content distribution platform, comprising:
   receiving, from a user computing device, a request for initial access of a user to a digital content distribution platform;
   granting access to the digital content distribution platform based upon the request for initial access, wherein granting access comprises:
      providing the user with a line-of-credit usable by the user to purchase access to digital content files from the digital content distribution platform, wherein an indication of the line-of-credit provided to the user is transmitted electronically to the user computing device of the user and wherein the line-of-credit is configured to renew at least a portion of the line of credit when a debt accrued in the line-of-credit is satisfied;
   receiving, from the user, a selection of a digital content file located on the digital content distribution platform;
   providing the user with access to the selected digital content file in exchange for a payment from the line-of-credit;
   incorporating an interactive advertisement into the selected digital content file according to a parameter associated with the user, said interactive advertisement configured to receive an interaction from the user computing device;
   transmitting the selected digital content file and incorporated interactive advertisement each configured to display on a graphical user interface (GUI) of the user computing device; and
   renewing, in response to the interactive advertisement receiving the interaction, at least a portion of the line of credit.

2. The method of claim 1, wherein the parameter associated with the user comprises demographic data associated with the user.

3. The method of claim 1, wherein the parameter associated with the user comprises a viewing behavior of the user.

4. The method of claim 1, wherein incorporating the interactive advertisement comprises:
   transmitting a prompt to the user computing device, said prompt requesting a location for the interactive advertisement with respect to the selected digital content file.

5. The method of claim 4, wherein the interactive advertisement is incorporated into the selected digital content file further according to a response associated with the prompt.

6. The method of claim 1, wherein the interactive advertisement includes a shopping activity associated with the selected digital content file.

7. The method of claim 1, further comprising:
increasing the line of credit according to the interaction with the interactive advertisement.

8. The method of claim 1, further comprising:
selecting the interactive advertisement according to a behavior of the user.

9. The method of claim 1, further comprising:
transmitting a social media prompt to the user computing device, said social media prompt requesting the user to promote, to non-members of the digital content distribution platform, the selected digital content file.

10. The method of claim 9, further comprising:
renewing, in response to the user promoting, to non-members of the digital content distribution platform, the selected digital content file, at least a portion of the line of credit.

11. A system for access to a digital content distribution platform, comprising:
a digital content distribution platform comprising:
    a server, said server configured to:
        receive, from a user computing device, a request for initial access of a user to a digital content distribution platform;
        grant access to the digital content distribution platform based upon the request for initial access, wherein granting access comprises:
            providing, via a line of credit module operating on the server, the user with a line-of-credit usable by the user to purchase access to digital content files from the digital content distribution platform, wherein an indication of the line-of-credit provided to the user is transmitted electronically to the user computing device of the user and wherein the line-of-credit is configured to renew at least a portion of the line of credit when a debt accrued in the line-of-credit is satisfied;
        receive, from the user computing device, a selection of a digital content file located on the digital content distribution platform; and
an application server, said application server configured to:
    provide the user with access to the selected digital content file in exchange for a payment from the line-of-credit;
    incorporate an interactive advertisement into the selected digital content file according to a parameter associated with the user, said interactive advertisement configured to receive an interaction from the user computing device;
    transmit the selected digital content file and incorporated interactive advertisement each configured to display on a graphical user interface (GUI) of the user computing device; and
    renew, via the line of credit module and in response to the interactive advertisement receiving the interaction, at least a portion of the line of credit.

12. The system of claim 11, wherein the parameter associated with the user comprises demographic data associated with the user.

13. The system of claim 11, wherein the parameter associated with the user comprises a viewing behavior of the user.

14. The system of claim 11, wherein incorporating the interactive advertisement comprises:
transmitting a prompt to the user computing device, said prompt requesting a location for the interactive advertisement with respect to the selected digital content file.

15. The system of claim 14, wherein the interactive advertisement is incorporated into the selected digital content file further according to a response associated with the prompt.

16. The system of claim 11, wherein the interactive advertisement includes a shopping activity associated with the selected digital content file.

17. The system of claim 11, wherein the server is further configured to, via the line of credit module, increase the line of credit according to the interaction with the interactive advertisement.

18. The system of claim 11, wherein the application server is further configured to select the interactive advertisement according to a behavior of the user.

19. The system of claim 11, wherein the application server is further configured to transmit a social media prompt to the user computing device, said social media prompt requesting the user to promote, to non-members of the digital content distribution platform, the selected digital content file.

20. The system of claim 19, wherein the application server is further configured to renew, via the line of credit module and in response to the user promoting, to non-members of the digital content distribution platform, the selected digital content file, at least a portion of the line of credit.

* * * * *